(12) United States Patent
Wu et al.

(10) Patent No.: US 11,539,300 B1
(45) Date of Patent: Dec. 27, 2022

(54) DC TO DC POWER CONVERTER DEVICE CAPABLE OF EITHER BIDIRECTIONAL STEP-UP CONVERSION OR BIDIRECTIONAL STEP-DOWN CONVERSION, AND CONTROL METHOD THEREOF

(71) Applicant: VOLTRONIC POWER TECHNOLOGY CORPORATION, Taipei (TW)

(72) Inventors: Jian-Qun Wu, Shenzhen (CN); Stone Peng, Shenzhen (CN); Juor-Ming Hsieh, Taipei (TW)

(73) Assignee: VOLTRONIC POWER TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 17/525,655

(22) Filed: Nov. 12, 2021

(30) Foreign Application Priority Data

Aug. 24, 2021 (CN) .......................... 202110973735.2

(51) Int. Cl.
*H02M 3/335* (2006.01)
*H02M 3/00* (2006.01)

(52) U.S. Cl.
CPC ......... *H02M 3/33584* (2013.01); *H02M 3/01* (2021.05); *H02M 3/33573* (2021.05)

(58) Field of Classification Search
CPC . H02M 3/33584; H02M 3/01; H02M 3/33573
See application file for complete search history.

(56) References Cited

U.S. PATENT DOCUMENTS

| 4,953,068 | A  | * | 8/1990  | Henze    | H02M 3/33584 |
|           |    |   |         |          | 363/127      |
| 6,937,483 | B2 | * | 8/2005  | Zhu      | H02M 3/33576 |
|           |    |   |         |          | 363/17       |
| 9,748,855 | B2 | * | 8/2017  | Lee      | H02M 3/33584 |
| 9,837,908 | B2 | * | 12/2017 | Suetomi  | H02M 3/33584 |
| 10,389,275| B2 | * | 8/2019  | Notsch   | H02M 7/5387  |
| 10,498,247| B2 | * | 12/2019 | Murakami | H02M 3/33584 |
| 2013/0343093 | A1 | * | 12/2013 | Ando | H02M 3/33584 |
|           |    |   |         |          | 363/17       |
| 2015/0229225 | A1 | * | 8/2015 | Jang | H02M 3/285 |
|           |    |   |         |          | 363/17       |
| 2015/0263635 | A1 | * | 9/2015 | Fu | H02M 3/33576 |
|           |    |   |         |          | 363/17       |

(Continued)

*Primary Examiner* — Yusef A Ahmed
(74) *Attorney, Agent, or Firm* — Hamre, Schumann, Mueller & Larson, P.C.

(57) ABSTRACT

A DC to DC power converter device includes a controller, and a DC to DC resonant converter that includes first and second full bridge chopper circuits (FBCCs) and an LLC resonant converter coupled between the first and second FBCCs. To cause the DC to DC resonant converter to operate in a conversion mode where an input voltage received by the second FBCC is converted to an output voltage provided by the first FBCC, the controller controls switches of the second FBCC and switches of the first FBCC to transition between an ON state and an OFF state with the ON state reoccurring at a frequency lower than a resonant frequency of the DC to DC resonant converter, so that the output voltage can be higher than the input voltage.

11 Claims, 6 Drawing Sheets

(56) References Cited

U.S. PATENT DOCUMENTS

| | | | |
|---|---|---|---|
| 2015/0333634 A1* | 11/2015 | Yoshida | H02M 3/33584 363/21.03 |
| 2016/0099646 A1* | 4/2016 | Safaee | H02M 3/33507 363/17 |
| 2016/0294294 A1* | 10/2016 | Ye | H02M 3/33592 |
| 2019/0173387 A1* | 6/2019 | Tanaka | H02M 1/08 |
| 2020/0144926 A1* | 5/2020 | Murakami | H02M 3/33573 |
| 2020/0212816 A1* | 7/2020 | Sun | H02M 3/33561 |
| 2021/0075318 A1* | 3/2021 | Lee | H02M 3/07 |

* cited by examiner

DC TO DC POWER CONVERTER DEVICE CAPABLE OF EITHER BIDIRECTIONAL STEP-UP CONVERSION OR BIDIRECTIONAL STEP-DOWN CONVERSION, AND CONTROL METHOD THEREOF

CROSS-REFERENCE TO RELATED APPLICATION

This application claims priority of Chinese Patent Application No. 202110973735.2, filed on Aug. 24, 2021.

FIELD

The disclosure relates to direct current to direct current (DC to DC) power conversion, and more particularly to a DC to DC power converter device capable of either bidirectional step-up conversion or bidirectional step-down conversion and to a control method thereof.

BACKGROUND

A conventional direct current to direct current (DC to DC) LLC converter has a first side and a second side, and includes a first full bridge chopper circuit coupled to the first side, a second full bridge chopper circuit coupled to the second side, and an LLC resonant circuit coupled between the first and second full bridge chopper circuits. Each of the first and second full bridge chopper circuits includes four power switches. The LLC resonant circuit includes a resonant capacitor, a resonant inductor and a transformer.

A conventional control method for controlling transition of the power switches of the first and second full bridge chopper circuits between an ON state and an OFF state can cause the conventional DC to DC LLC converter to perform either step-up or step-down conversion in a direction from the first side to the second side (with the first side serving as the input side and the second side serving as the output side), can cause the conventional DC to DC LLC converter to perform step-down conversion in a direction from the second side to the first side (with the second side serving as the input side and the first side serving as the output side), but cannot cause the conventional DC to DC LLC converter to perform step-up conversion in the direction from the second side to the first side.

SUMMARY

Therefore, an object of the disclosure is to provide a direct current to direct current (DC to DC) power converter device and a control method thereof that can alleviate the drawback of the prior art.

According to an aspect of the disclosure, the DC to DC power converter device includes a DC to DC resonant converter and a controller. The DC to DC resonant converter has a first side and a second side. Each of the first and second sides includes a positive terminal and a negative terminal. The DC to DC resonant converter includes a first full bridge chopper circuit, a second full bridge chopper circuit and an LLC resonant circuit. The first full bridge chopper circuit includes a first switch, a second switch, a third switch and a fourth switch. The first switch is coupled between the positive terminal of the first side and a first node. The second switch is coupled between the first node and the negative terminal of the first side. The third switch is coupled between the positive terminal of the first side and a second node. The fourth switch is coupled between the second node and the negative terminal of the first side. The second full bridge chopper circuit includes a fifth switch, a sixth switch, a seventh switch and an eighth switch. The fifth switch is coupled between the positive terminal of the second side and a third node. The sixth switch is coupled between the third node and the negative terminal of the second side. The seventh switch is coupled between the positive terminal of the second side and a fourth node. The eighth switch is coupled between the fourth node and the negative terminal of the second side. The LLC resonant circuit includes a resonant capacitor, a resonant inductor and a transformer. The transformer includes a primary winding and a secondary winding. The resonant capacitor, the resonant inductor and the primary winding are coupled in series between the first and second nodes. The secondary winding is coupled between the third and fourth nodes. The controller is coupled to the first to eighth switches, and controls transition of each of the first to eighth switches between an ON state and an OFF state so that the DC to DC resonant converter operates in one of a first conversion mode, a second conversion mode and a third conversion mode. In the first conversion mode, an input voltage received at the first side is converted to an output voltage provided at the second side. In each of the second and third conversion modes, an input voltage received at the second side is converted to an output voltage provided at the first side. To cause the DC to DC resonant converter to operate in the third conversion mode, the controller controls the first to eighth switches in such a way that: the second and fourth to eighth switches transition between the ON state and the OFF state with the ON state reoccurring at a frequency lower than a resonant frequency of the DC to DC power converter device when the second side serves as an input side, wherein the resonant frequency is related to the resonant capacitor and the resonant inductor, and wherein the fifth and eighth switches transition between the ON state and the OFF state synchronously, the sixth and seventh switches transition between the ON state and the OFF state synchronously, an operating state of the sixth switch is substantially always different from an operating state of the fifth switch, the sixth switch transitions from the OFF state to the ON state after the fifth switch transitions from the ON state to the OFF state, and transitions from the ON state to the OFF state before the fifth switch transitions from the OFF state to the ON state, the second switch transitions from the OFF state to the ON state upon completion of one cycle of resonance of the resonant capacitor and the resonant inductor when the fifth switch stays in the ON state, and transitions from the ON state to the OFF state upon the fifth switch transitioning from the ON state to the OFF state, and the fourth switch transitions from the OFF state to the ON state upon completion of one cycle of resonance of the resonant capacitor and the resonant inductor when the sixth switch stays in the ON state, and transitions from the ON state to the OFF state upon the sixth switch transitioning from the ON state to the OFF state; and the first and third switches stay in the OFF state.

According to another aspect of the disclosure, the control method is for controlling the aforesaid DC to DC resonant converter, and includes a procedure that is performed when the second side serves as an input side while the first side serves as an output side, and that includes steps of: controlling the second and fourth to eighth switches to transition between an ON state and an OFF state with the ON state reoccurring at a frequency lower than a resonant frequency of the DC to DC power converter device when the second side serves as the input side, wherein the resonant frequency is related to the resonant capacitor and the resonant inductor, and wherein the fifth and eighth switches transition between the ON state and the OFF state synchronously, the sixth and seventh switches transition between the ON state and the OFF state synchronously, an operating state of the sixth switch is substantially always different from an operating state of the fifth switch, the sixth switch transitions from the OFF state to the ON state after the fifth switch transitions from the ON state to the OFF state, and transitions from the ON state to the OFF state before the fifth switch transitions from the OFF state to the ON state, the second switch transitions from the OFF state to the ON state upon completion of one cycle of resonance of the resonant capacitor and the resonant inductor when the fifth switch stays in the ON state, and transitions from the ON state to the OFF state upon the fifth switch transitioning from the ON state to the OFF state, and the fourth switch transitions from the OFF state to the ON state upon completion of one cycle of resonance of the resonant capacitor and the resonant inductor when the sixth switch stays in the ON state, and transitions from the ON state to the OFF state upon the sixth switch transitioning from the ON state to the OFF state; and controlling the first and third switches to stay in an OFF state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
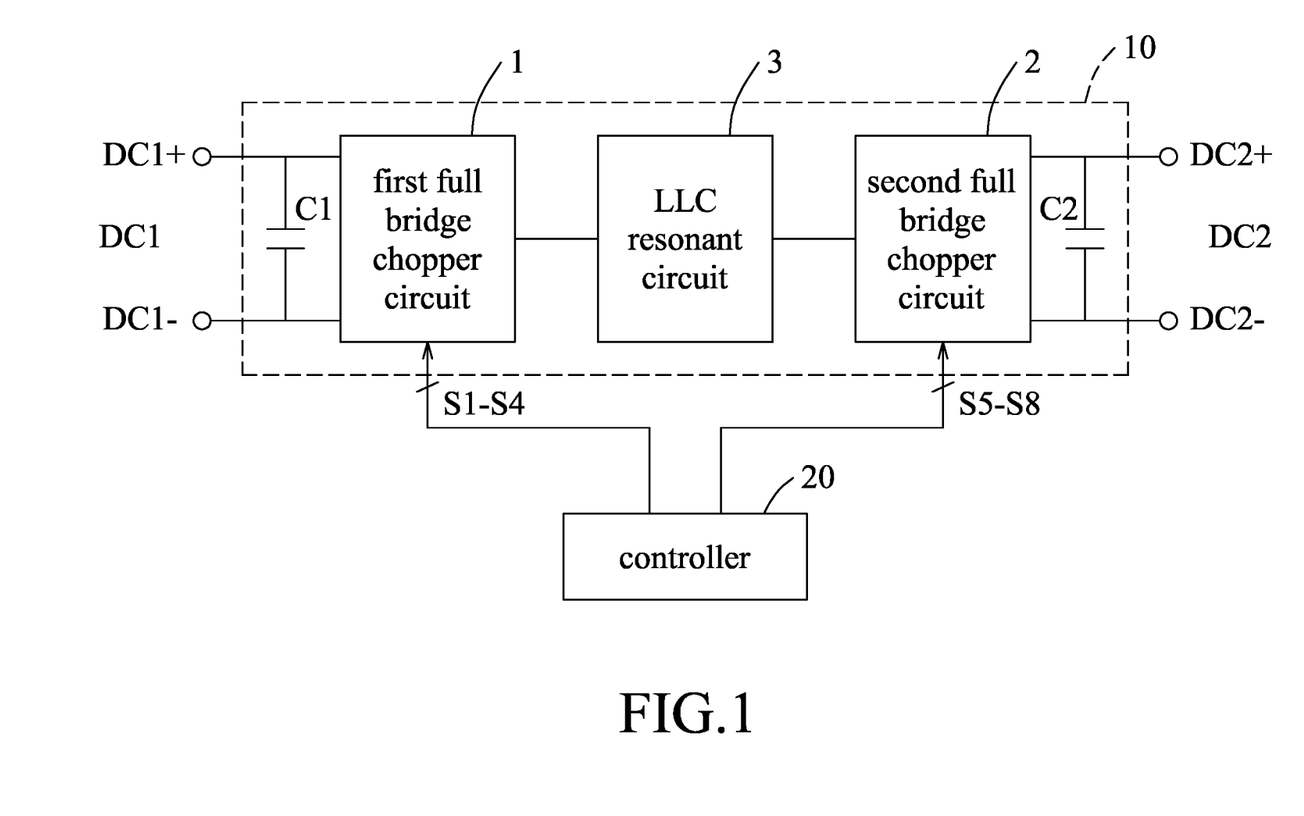
FIG. 1 is a circuit block diagram illustrating an embodiment of a direct current to direct current (DC to DC) power converter device according to the disclosure.

Referring to FIG. 1, an embodiment of a direct current to direct current (DC to DC) power converter device according to the disclosure includes a DC to DC resonant converter 10 and a controller 20.

The DC to DC resonant converter 10 has a first side (DC1) and a second side (DC2). Each of the first and second sides (DC1, DC2) includes a positive terminal (DC1+/DC2+) and a negative terminal (DC1−/DC2−). The first and second sides (DC1, DC2) can respectively serve as an input side and an output side, or can respectively serve as an output side and an input side. When the first side (DC1) is to serve as an input side, an input voltage that is direct current is supplied to the first side (DC1). When the second side (DC2) is to serve as an input side, an input voltage that is direct current is supplied to the second side (DC2).

In this embodiment, the DC to DC resonant converter 10 includes a first filtering capacitor (C1), a second filtering capacitor (C2), a first full bridge chopper circuit 1, a second full bridge chopper circuit 2 and an LLC resonant circuit 3.

The first filtering capacitor (C1) is coupled between the positive and negative terminals (DC1+, DC1−) of the first side (DC1), and the second filtering capacitor (C2) is coupled between the positive and negative terminals (DC2+, DC2−) of the second side (DC2).

Figure 2:
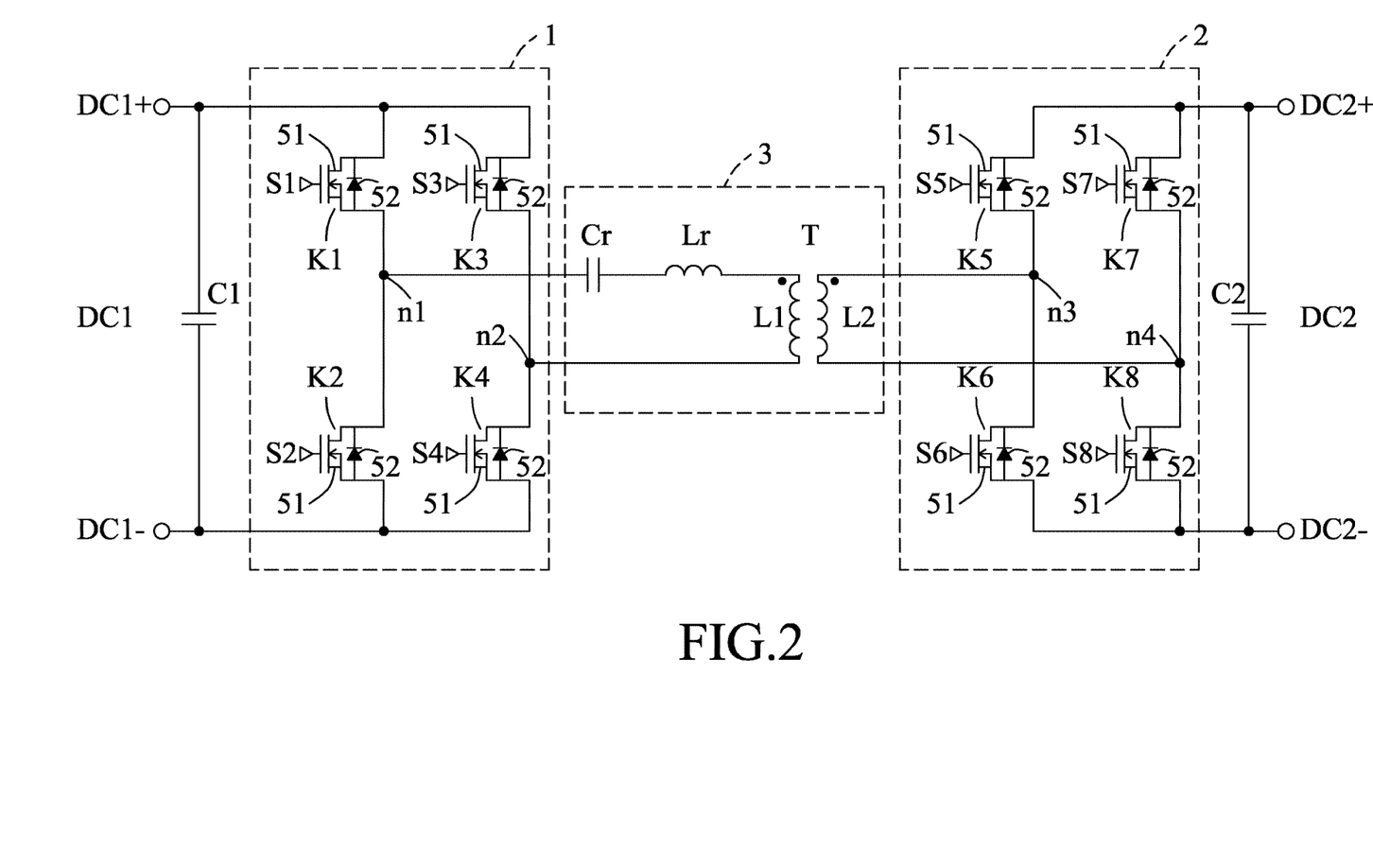
FIG. 2 is a circuit diagram illustrating a DC to DC resonant converter of the embodiment.
Figure 3:
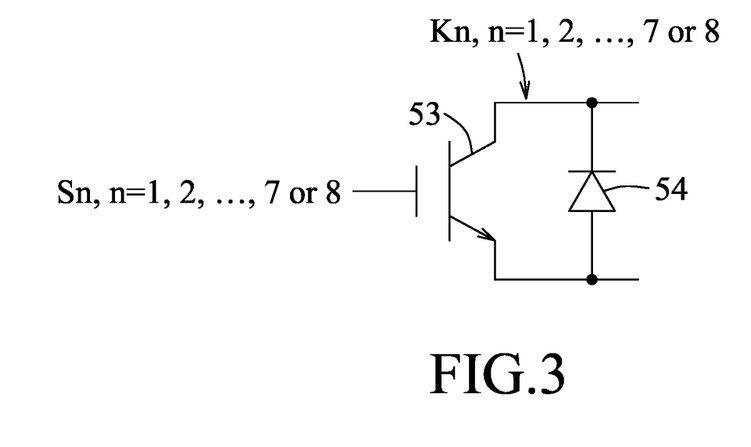
FIG. 3 is a circuit diagram, illustrating another implementation of each switch of the DC to DC resonant converter.

Referring to FIG. 2, the first full bridge chopper circuit 1 includes a first switch (K1), a second switch (K2), a third switch (K3) and a fourth switch (K4). The first switch (K1) is coupled between the positive terminal (DC1+) of the first side (DC1) and a first node (n1). The second switch (K2) is coupled between the first node (n1) and the negative terminal (DC1−) of the first side (DC1). The third switch (K3) is coupled between the positive terminal (DC1+) of the first side (DC1) and a second node (n2). The fourth switch (K4) is coupled between the second node (n2) and the negative terminal (DC1−) of the first side (DC1). Each of the first to fourth switches (K1-K4) is transitionable between an ON state and an OFF state. In this embodiment, the first to fourth switches (K1-K4) are identical to one another, and each of the first to fourth switches (K1-K4) includes a metal oxide semiconductor field effect transistor (MOSFET) 51 (e.g., an N-type MOSFET) with an anti-parallel body diode 52. For each of the first to fourth switches (K1-K4), when the MOSFET 51 conducts, the switch (K1/K2/K3/K4) is in the ON state, and when the MOSFET 51 does not conduct, the switch (K1/K2/K3/K4) is in the OFF state. However, as shown in FIG. 3, in another embodiment, each of the first to fourth switches (K1-K4) includes an insulated gate bipolar transistor (IGBT) 53 (e.g., an N-type IGBT), and an anti-parallel diode 54 that is coupled to the IGBT 53. For each of the first to fourth switches (K1-K4), when the IGBT 53 conducts, the switch (K1/K2/K3/K4) is in the ON state, and when the IGBT 53 does not conduct, the switch (K1/K2/K3/K4) is in the OFF state. It should be noted that the first full bridge chopper circuit 1 can serve as a full bridge rectifier when all of the first to fourth switches (K1-K4) stay in the OFF state.

The second full bridge chopper circuit 2 includes a fifth switch (K5), a sixth switch (K6), a seventh switch (K7) and an eighth switch (K8). The fifth switch (K5) is coupled between the positive terminal (DC2+) of the second side (DC2) and a third node (n3). The sixth switch (K6) is coupled between the third node (n3) and the negative terminal (DC2−) of the second side (DC2). The seventh switch (K7) is coupled between the positive terminal (DC2+) of the second side (DC2) and a fourth node (n4). The eighth switch (K8) is coupled between the fourth node (n4) and the negative terminal (DC2−) of the second side (DC2). Each of the fifth to eighth switches (K5-K8) is transitionable between an ON state and an OFF state. In this embodiment, the fifth to eighth switches (K5-K8) are identical to one another, and each of the fifth to eighth switches (K5-K8) includes a MOSFET 51 (e.g., an N-type MOSFET) with an anti-parallel body diode 52. For each of the fifth to eighth switches (K5-K8), when the MOSFET 51 conducts, the switch (K5/K6/K7/K8) is in the ON state, and when the MOSFET 51 does not conduct, the switch (K5/K6/K7/K8) is in the OFF state. However, as shown in FIG. 3, in said another embodiment, each of the fifth to eighth switches (K5-K8) includes an IGBT 53 (e.g., an N-type IGBT), and an anti-parallel diode 54 that is coupled to the IGBT 53. For each of the fifth to eighth switches (K5-K8), when the IGBT 53 conducts, the switch (K5/K6/K7/K8) is in the ON state, and when the IGBT 53 does not conduct, the switch (K5/K6/K7/K8) is in the OFF state. It should be noted that the second full bridge chopper circuit 2 can serve as a full bridge rectifier when all of the fifth to eighth switches (K5-K8) stay in the OFF state.

The LLC resonant circuit 3 includes a resonant capacitor (Cr), a resonant inductor (Lr) and a transformer (T). The transformer (I) includes a primary winding (L1) and a secondary winding (L2). Each of the primary and secondary windings (L1, L2) has a first terminal (e.g., a dotted terminal) and a second terminal (e.g., a non-dotted terminal). The first terminals of the primary and secondary windings (L1, L2) have the same voltage polarity. The resonant capacitor (Cr), the resonant inductor (Lr) and the primary winding (L1) are coupled in series between the first and second nodes (n1, n2), with a terminal of the resonant capacitor (Cr) coupled to the first node (n1) and the second terminal of the primary winding (L1) coupled to the second node (n2). The first and second terminals of the secondary winding (L2) are respectively coupled to the third and fourth nodes (n3, n4).

Referring to FIGS. 1 and 2, the controller 20 is coupled to the first to eighth switches (K1-K8), and controls transition of each of the first to eighth switches (K1-K8) between the ON state and the OFF state so that the DC to DC resonant converter 10 operates in one of a first conversion mode, a second conversion mode and a third conversion mode. In the first conversion mode, the first side (DC1) serves as an input side, the second side (DC2) serves as an output side, an input voltage received at the first side (DC1) is converted to an output voltage provided at the second side (DC2), and the output voltage is either greater than or smaller than the input voltage. In the second conversion mode, the second side (DC2) serves as an input side, the first side (DC1) serves as an output side, an input voltage received at the second side (DC2) is converted to an output voltage provided at the first side (DC1), and the output voltage is smaller than the input voltage. In the third conversion mode, the second side (DC2) serves as an input side, the first side (DC1) serves as an output side, an input voltage received at the second side (DC2) is converted to an output voltage provided at the first side (DC1), and the output voltage can be greater than the input voltage.

Figure 4:
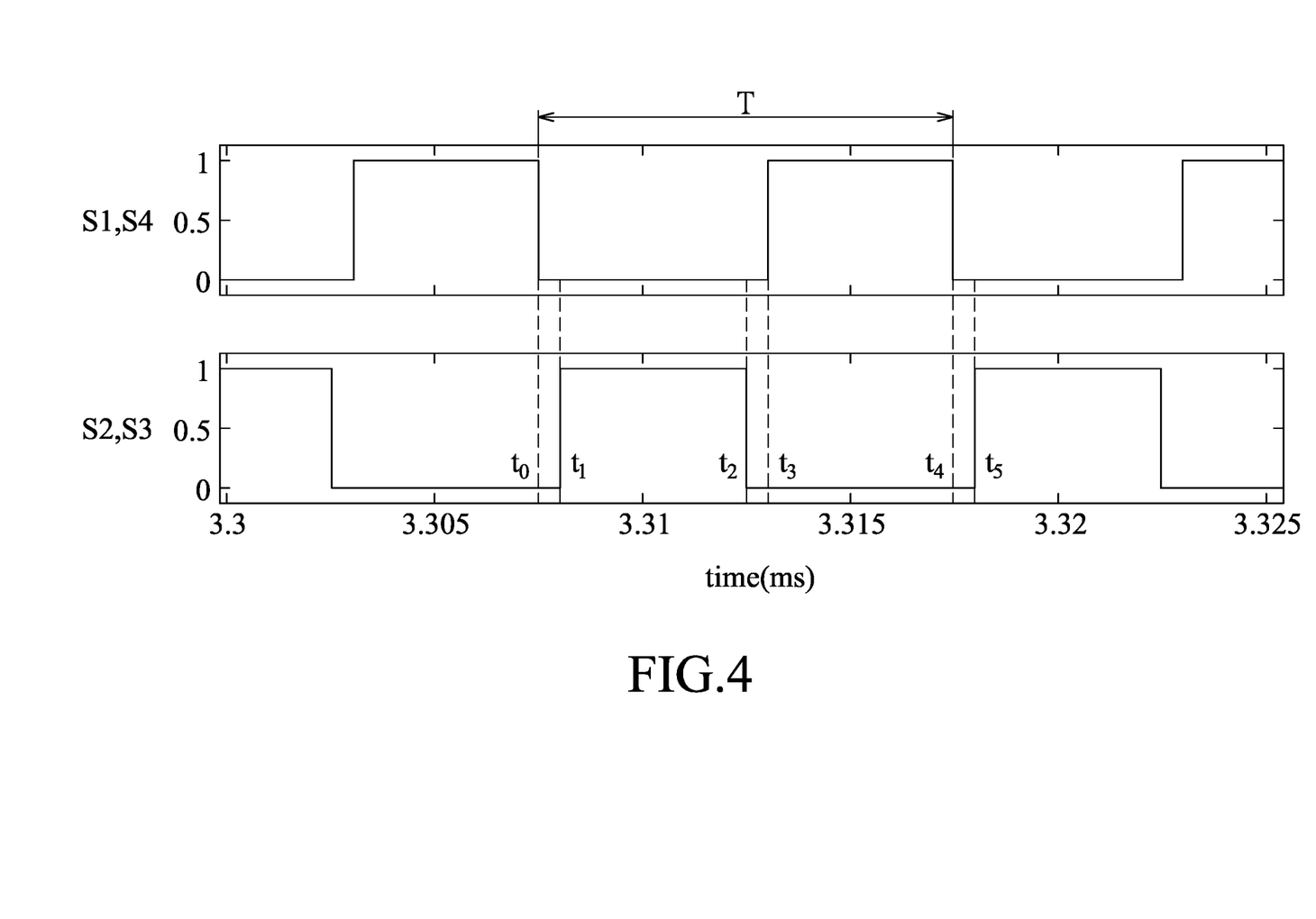
FIG. 4 is a timing diagram illustrating first to fourth control signals generated by a controller of the embodiment to cause the DC to DC resonant converter to operate in a first conversion mode.

Referring to FIGS. 1, 2 and 4, to cause the DC to DC resonant converter 10 to operate in the first conversion mode, the controller 20 controls the first to fourth switches (K1-K4) to transition between the ON state and the OFF state with the ON state (or the OFF state) reoccurring at a first frequency, and controls the fifth to eighth switches (K5-K8) to stay in the OFF state. To be specific, as shown in FIG. 4, the controller 20 generates a first control signal (S1), a second control signal (S2), a third control signal (S3) and a fourth control signal (S4) to respectively control the first to fourth switches (K1-K4). Each of the first to fourth control signals (S1-S4) has the first frequency, and a logic high level and a logic low level of the control signal (S1/S2/S3/S4) respectively correspond to the ON state and the OFF state of the corresponding one of the first to fourth switches (K1-K4). The first and fourth control signals (S1, S4) are identical to each other, so the first and fourth switches (K1, K4) transition between the ON state and the OFF state synchronously. The second and third control signals (S2, S3) are identical to each other, so the second and third switches (K2, K3) transition between the ON state and the OFF state synchronously. The second control signal (S2) is substantially complementary to the first control signal (S1), so an operating state (either the ON state or the OFF state) of the second switch (K2) is substantially always different from an operating state (either the ON state or the OFF state) of the first switch (K1). A rising edge of the first control signal (S1) lags a falling edge of the second control signals (S2) by a first dead time and a rising edge of the second control signal (S2) lags a falling edge of the first control signal (S1) by the first dead time (e.g., a time difference between time points $t_0$ and $t_1$ and a time difference between time points $t_2$ and $t_3$), so the second switch (K2) transitions from the OFF state to the ON state after the first switch (K1) transitions from the ON state to the OFF state, and transitions from the ON state to the OFF state before the first switch (K1) transitions from the OFF state to the ON state. Therefore, simultaneous conduction of the MOSFETs 51 of the first and second switches (K1, K2) and simultaneous conduction of the MOSFETs 51 of the third and fourth switches (K3, K4) are prevented. In addition, the controller 20 generates a fifth control signal (S5), a sixth control signal (S6), a seventh control signal (S7) and an eighth control signal (S8) that stay in a logic low level for receipt by the fifth to eighth switches (K5-K8), or does not generate the fifth to eighth control signals (S5-S8) so the fifth to eighth switches (K5-K8) stay in the OFF state and the second full bridge chopper circuit 2 serves as a full bridge rectifier. It should be noted that the first dead time should be determined based on a transition speed of the first to fourth switches (K1-K4). In this embodiment, since the MOSFETs 51 of the first to fourth switches (K1-K4) have a relatively fast transition speed, the first dead time may be, for example, in a range of from 0.3 μs to 0.5 μs. In said another embodiment, since the IGBTs 53 (see FIG. 3) of the first to fourth switches (K1-K4) have a relatively slow transition speed, the first dead time may be, for example, in a range of from 0.5 μs to 1 μs.

When the DC to DC resonant converter 10 operates in the first conversion mode, each control cycle of the DC to DC resonant converter 10 has a time length of 1/f1, is divided into four operation phases that include a first operation phase, a second operation phase, a third operation phase and a fourth operation phase, where "f1" denotes the first frequency.

In a current control cycle (I) from time point $t_0$ to time point $t_4$, during the first operation phase from time point $t_0$ to time point $t_1$, all of the first to eighth switches (K1-K8) stay in the OFF state, preventing simultaneous conduction of the MOSFETs 51 of the first and second switches (K1, K2) and simultaneous conduction of the MOSFETs 51 of the third and fourth switches (K3, K4). During the second operation phase from time point $t_1$ to time point $t_2$, the second and third switches (K2, K3) enter the ON state while the first and fourth to eighth switches (K1, K4-K8) remain in the OFF state, an input current corresponding to the input voltage received at the first side (DC1) flows sequentially through the conducting MOSFET 51 of the third switch (K3), the primary winding (L1), the resonant inductor (Lr), the resonant capacitor (Cr) and the conducting MOSFET 51 of the second switch (K2) to perform resonant charging of the resonant capacitor (Cr) and the resonant inductor (Lr), and an induction current generated by the secondary winding (L2) flows sequentially through the body diode 52 of the non-conducting MOSFET 51 of the seventh switch (K7), the second filtering capacitor (C2) and the body diode 52 of the non-conducting MOSFET 51 of the sixth switch (K6) to perform charging of the second filtering capacitor (C2), thereby converting the input voltage received at the first side (DC1) to the output voltage provided at the second side (DC2). During the third operation phase from time point $t_2$ to time point $t_3$, all of the first to eighth switches (K1-K8) stay in the OFF state, preventing simultaneous conduction of the MOSFETs 51 of the first and second switches (K1, K2) and simultaneous conduction of the MOSFETs 51 of the third and fourth switches (K3, K4). During the fourth operation phase from time point $t_3$ to time point $t_4$, the first and fourth switches (K1, K4) enter the ON state while the second, third and fifth to eighth switches (K2, K3, K5-K8) remain in the OFF state, the input current corresponding to the input voltage received at the first side (DC1) flows sequentially through the conducting MOSFET 51 of the first switch (K1), the resonant capacitor (Cr), the resonant inductor (Lr), the primary winding (L1) and the conducting MOSFET 51 of the fourth switch (K4) to perform resonant charging of the resonant capacitor (Cr) and the resonant inductor (Lr), and the induction current generated by the secondary winding (L2) flows sequentially through the body diode 52 of the non-conducting MOSFET 51 of the fifth switch (K5), the second filtering capacitor (C2) and the body diode 52 of the non-conducting MOSFET 51 of the eighth switch (K8) to perform charging of the second filtering capacitor (C2), thereby converting the input voltage received at the first side (DC1) to the output voltage provided at the second side (DC2). At time point $t_4$, the fourth operation phase of the current control cycle (T) ends, and the first operation phase of a next control cycle starts.

Figure 5:
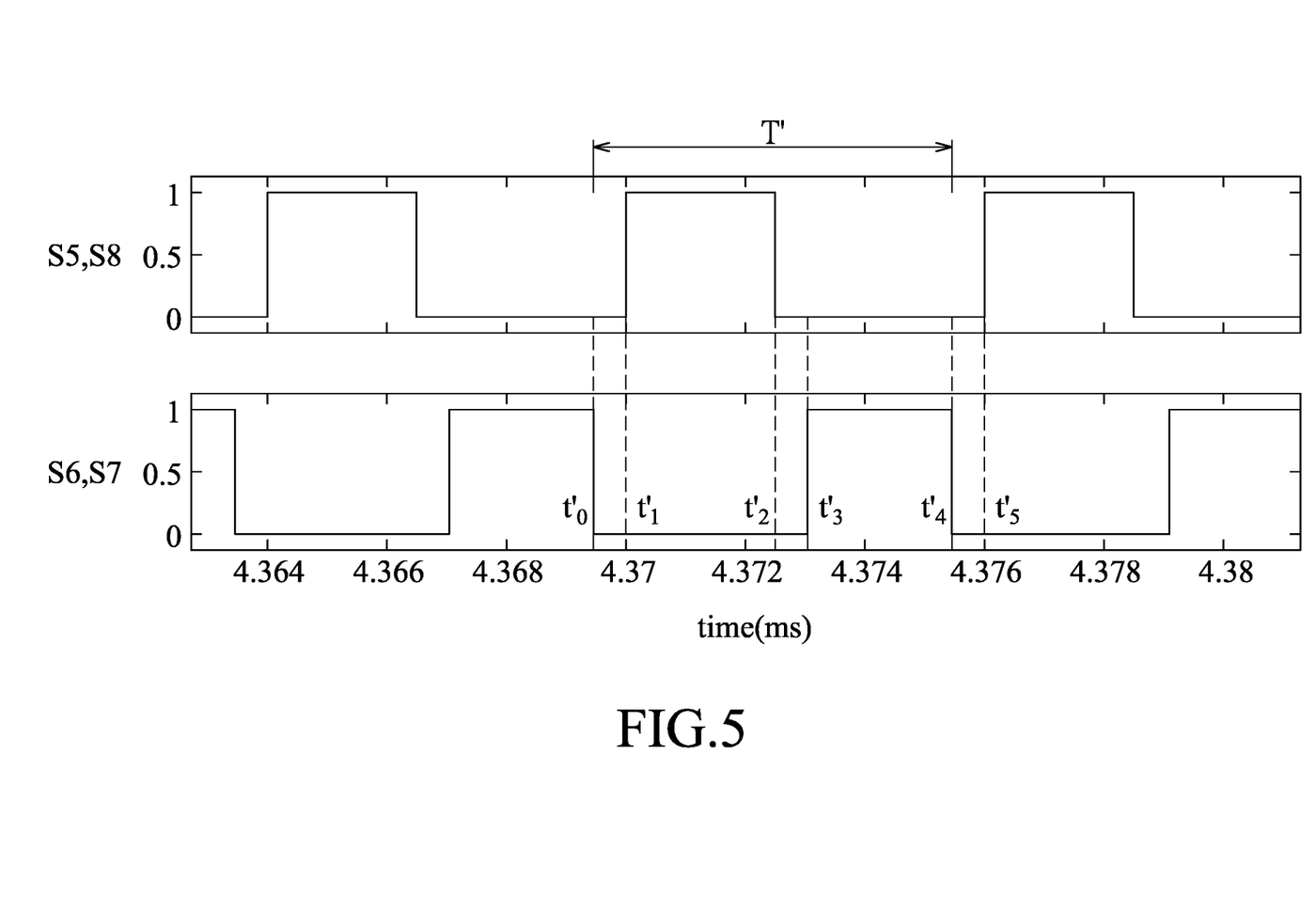
FIG. 5 is a timing diagram illustrating fifth to eighth control signals generated by the controller to cause the DC to DC resonant converter to operate in a second conversion mode.

Referring to FIGS. 1, 2 and 5, to cause the DC to DC resonant converter 10 to operate in the second conversion mode, the controller 20 controls the fifth to eighth switches (K5-K8) to transition between the ON state and the OFF state with the ON state (or the OFF state) reoccurring at a second frequency, and controls the first to fourth switches (K1-K4) to stay in the OFF state. The second frequency is higher than a resonant frequency of the DC to DC power converter device when the second side (DC2) serves as the input side, wherein the resonant frequency is related to the resonant capacitor (Cr) and the resonant inductor (Lr). The resonant frequency can be expressed as $$\frac{1}{2\pi \cdot \sqrt{L_{r1} \cdot C_{r1}}},$$

where "$L_{r1}$" denotes an equivalent inductance that is attributed to parasitic inductances of the second full bridge chopper circuit 2 and an inductance of the resonant inductor (Lr) and that is measurable, and "$C_{r1}$" denotes an equivalent capacitance that is attributed to parasitic capacitances of the second full bridge chopper circuit 2 and a capacitance of the resonant capacitor (Cr) and that is measurable. To be specific, as shown in FIG. 5, the controller 20 generates the fifth to eighth control signals (S5-S8) to respectively control the fifth to eighth switches (K5-K8). Each of the fifth to eighth control signals (S5-S8) has the second frequency, and a logic high level and the logic low level of the control signal (S5/S6/S7/S8) respectively correspond to the ON state and the OFF state of the corresponding one of the fifth to eighth switches (K5-K8). The fifth and eighth control signals (S5, S8) are identical to each other, so the fifth and eighth switches (K5, K8) transition between the ON state and the OFF state synchronously. The sixth and seventh control signals (S6, S7) are identical to each other, so the sixth and seventh switches (K6, K7) transition between the ON state and the OFF state synchronously. The sixth control signal (S6) is substantially complementary to the fifth control signal (S5), so an operating state (either the ON state or the OFF state) of the sixth switch (K6) is substantially always different from an operating state (either the ON state or the OFF state) of the fifth switch (K5). A rising edge of the fifth control signal (S5) lags a falling edge of the sixth control signal (S6) by a second dead time and a rising edge of the sixth control signal (S6) lags a falling edge of the fifth control signal (S5) by the second dead time (e.g., a time difference between time points $t'_0$ and $t'_1$ and a time difference between time points $t'_2$ and $t'_3$), so the sixth switch (K6) transitions from the OFF state to the ON state after the fifth switch (K5) transitions from the ON state to the OFF state, and transitions from the ON state to the OFF state before the fifth switch (K5) transitions from the OFF state to the ON state, thereby preventing simultaneous conduction of the MOSFETs 51 of the fifth and sixth switches (K5, K6) and simultaneous conduction of the MOSFETs 51 of the seventh and eighth switches (K7, K8). In addition, the controller 20 generates the first to fourth control signals (S1-S4) that stay in the logic low level for receipt by the first to fourth switches (K1-K4), or does not generate the first to fourth control signals (S1-S4) so the first to fourth switches (K1-K4) stay in the OFF state and the first full bridge chopper circuit 1 serves as a full bridge rectifier. It should be noted that the second dead time should be determined based on a transition speed of the fifth to eighth switches (K5-K8).

When the DC to DC resonant converter 10 operates in the second conversion mode, each control cycle of the DC to DC resonant converter 10 has a time length of 1/f2, and is divided into four operation phases that include a first operation phase, a second operation phase, a third operation phase and a fourth operation phase, where "f2" denotes the second frequency. In an example, each control cycle has a time length of 6 µs as shown in FIG. 5, and the resonant frequency is 142 kHz (corresponding to a resonant period of 7 µs).

In a current control cycle (T') from time point $t'_0$ to time point $t'_4$ during the first operation phase from time point $t'_0$ to time point $t'_1$, all of the first to eighth switches (K1-K8) are in the OFF state, preventing simultaneous conduction of the MOSFETs 51 of the fifth and sixth switches (K5, K6) and simultaneous conduction of the MOSFETs 51 of the seventh and eighth switches (K7, K8). During the second operation phase from time point $t'_1$ to time point $t'_2$, the fifth and eighth switches (K5, K8) enter the ON state while the first to fourth, sixth and seventh switches (K1-K4, K6, K7) remain in the OFF state, an input current corresponding to the input voltage received at the second side (DC2) flows sequentially through the conducting MOSFET 51 of the fifth switch (K5), the secondary winding (L2) and the conducting MOSFET 51 of the eighth switch (K8), and an induction current generated by the primary winding (L1) flows sequentially through the resonant inductor (Lr), the resonant capacitor (Cr), the body diode 52 of the non-conducting MOSFET 51 of the first switch (K1), the first filtering capacitor (C1) and the body diode 52 of the non-conducting MOSFET 51 of the fourth switch (K4) to perform resonant charging of the resonant capacitor (Cr) and the resonant inductor (Lr) and charging of the first filtering capacitor (C1), thereby converting the input voltage received at the second side (DC2) to the output voltage provided at the first side (DC1). During the third operation phase from time point $t'_2$ to time point $t'_3$, all of the first to eighth switches (K1-K8) stay in the OFF state, preventing simultaneous conduction of the MOSFETs 51 of the fifth and sixth switches (K5, K6) and simultaneous conduction of the MOSFETs 51 of the seventh and eighth switches (K7, K8). During the fourth operation phase from time point $t'_3$ to time point $t'_4$, the sixth and seventh switches (K6, K7) enter the ON state while the first to fifth and eighth switches (K1-K5, K8) remain in the OFF state, the input current corresponding to the input voltage received at the second side (DC2) flows sequentially through the conducting MOSFET 51 of the seventh switch (K7), the secondary winding (L2) and the conducting MOSFET 51 of the sixth switch (K6), and the induction current generated by the primary winding (L1) flows sequentially through the body diode 52 of the non-conducting MOSFET 51 of the third switch (K3), the first filtering capacitor (C1), the body diode 52 of the non-conducting MOSFET 51 of the second switch (K2), the resonant capacitor (Cr) and the resonant inductor (Lr) to perform resonant charging of the resonant capacitor (Cr) and the resonant inductor (Lr) and charging of the first filtering capacitor (C1), thereby converting the input voltage received at the second side (DC2) to the output voltage provided at the first side (DC1). At time point $t'_4$, the fourth operation phase of the current control cycle (T') ends, and the first operation phase of a next control cycle starts.

Figure 6:
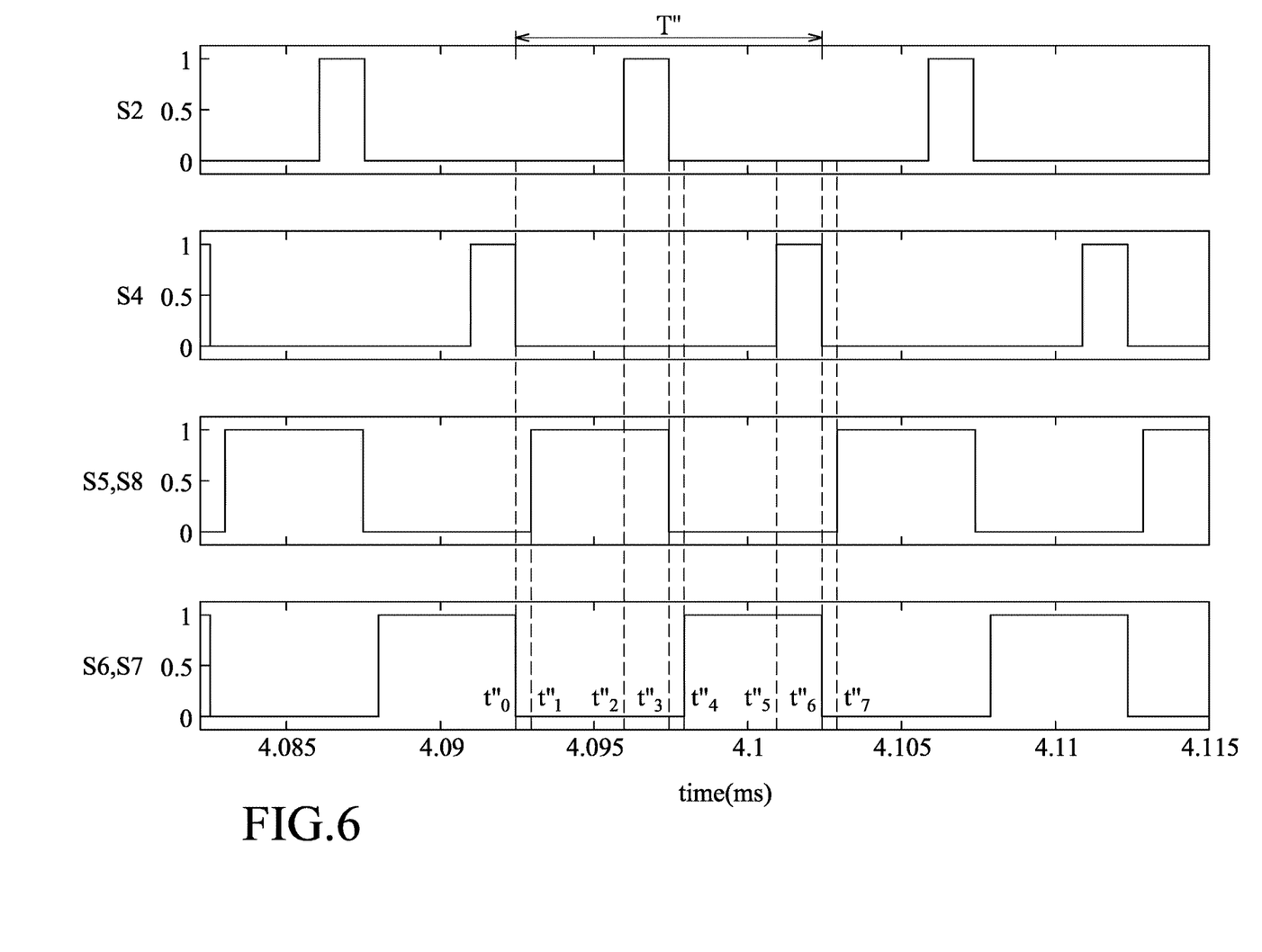
FIG. 6 is a timing diagram illustrating the second and fourth to eighth control signals generated by the controller to cause the DC to DC resonant converter to operate in a third conversion mode.

Referring to FIGS. 1, 2 and 6, to cause the DC to DC resonant converter 10 to operate in the third conversion mode, the controller 20 controls the second and fourth to eighth switches (K2, K4-K8) to transition between the ON state and the OFF state with the ON state (or the OFF state) reoccurring at a third frequency, and controls the first and third switches (K1, K3) to stay in the OFF state. The third frequency is lower than the resonant frequency. To be specific, as shown in FIG. 6, the controller 20 generates the second and fourth to eighth control signals (S2, S4-S8) to respectively control the second and fourth to eighth switches (K2, K4-K8). Each of the second and fourth to eighth control signals (S2, S4-S8) has the third frequency, and the logic high level and the logic low level of the control signal (S2/S4/S5/S6/S7/S8) respectively correspond to the ON state and the OFF state of the corresponding one of the second and fourth to eighth switches (K2, K4-K8). The fifth and eighth control signals (S5, S8) are identical to each other, so the fifth and eighth switches (K5, K8) transition between the ON state and the OFF state synchronously. The sixth and seventh control signals (S6, S7) are identical to each other, so the sixth and seventh switches (K6, K7) transition between the ON state and the OFF state synchronously. The sixth control signal (S6) is substantially complementary to the fifth control signal (S5), so the operating state (either the ON state or the OFF state) of the sixth switch (K6) is substantially always different from the operating state (either the ON state or the OFF state) of the fifth switch (K5). The rising edge of the fifth control signal (S5) lags the falling edge of the sixth control signal (S6) by the second dead time and the rising edge of the sixth control signal (S6) lags the falling edge of the fifth control signal (S5) by the second dead time (e.g., a time difference between time points $t''_0$ and $t''_1$ and a time difference between time points $t'''_3$ and $t''_4$), so the sixth switch (K6) transitions from the OFF state to the ON state after the fifth switch (K5) transitions from the ON state to the OFF state, and transitions from the ON state to the OFF state before the fifth switch (K5) transitions from the OFF state to the ON state, thereby preventing simultaneous conduction of the MOSFETs 51 of the fifth and sixth switches (K5, K6) and simultaneous conduction of the MOSFETs 51 of the seventh and eighth switches (K7, K8). The second control signal (S2) causes the second switch (K2) to transition from the OFF state to the ON state upon completion of one cycle of resonance of the resonant capacitor (Cr) and the resonant inductor (Lr) when the fifth switch (K5) stays in the ON state, and to transition from the ON state to the OFF state upon the fifth switch (K5) transitioning from the ON state to the OFF state, so when the second switch (K2) stays in the ON state, the resonant capacitor (Cr) can be charged by an induction current generated by the primary winding (L1). The fourth control signal (S4) causes the fourth switch (K4) to transition from the OFF state to the ON state upon completion of one cycle of resonance of the resonant capacitor (Cr) and the resonant inductor (Lr) when the sixth switch (K6) stays in the ON state, and to transition from the ON state to the OFF state upon the sixth switch (K6) transitioning from the ON state to the OFF state, so when the fourth switch (K4) stays in the ON state, the resonant capacitor (Cr) can be charged by the induction current generated by the primary winding (L1). In addition, the controller 20 generates the first and third control signals (S1, S3) that stay in the logic low level for receipt by the first and third switches (N1, K3), or does not generate the first and third control signals (S1, S3), so the first and third switches (K1, K3) stay in the OFF state.

When the DC to DC resonant converter 10 operates in the third conversion mode, each control cycle of the DC to DC resonant converter 10 has a time length of 1/f3, and is divided into six operation phases that include a first operation phase, a second operation phase, a third operation phase, a fourth operation phase, a fifth operation phase and a sixth operation phase, where "f3" denotes the third frequency. In an example, each control cycle has a time length of 10 µs as shown in FIG. 6, and the resonant frequency is 142 kHz (corresponding to a resonant period of 7 µs).

In a current control cycle (T") from time point $t''_0$ to time point $t''_6$, during the first operation phase from time point $t''_0$ to time point $t''_1$, all of the first to eighth switches (K1-K8) stay in the OFF state, preventing simultaneous conduction of the MOSFETs 51 of the fifth and sixth switches (K5, K6) and simultaneous conduction of the MOSFETs 51 of the seventh and eighth switches (K7, K8). During the second operation phase from time point $t''_1$ to time point $t''_2$, the fifth and eighth switches (K5, K8) enter the ON state while the first to fourth, sixth and seventh switches (K1-K4, K6, K7) remain in the OFF state, an input current corresponding to the input voltage received at the second side (DC2) flows sequentially through the conducting MOSFET 51 of the fifth switch (K5), the secondary winding (L2) and the conducting MOSFET 51 of the eighth switch (K8), and an induction current generated by the primary winding (L1) flows sequentially through the resonant inductor (Lr), the resonant capacitor (Cr), the body diode 52 of the non-conducting MOSFET 51 of the first switch (K1), the first filtering capacitor (C1) and the body diode 52 of the non-conducting MOSFET 51 of the fourth switch (K4) to perform resonant charging of the resonant capacitor (Cr) and the resonant inductor (Lr) and charging of the first filtering capacitor (C1), thereby converting the input voltage received at the second side (DC2) to the output voltage provided at the first side (DC1). One cycle of resonance of the resonant capacitor (Cr) and the resonant inductor (Lr) completes at time point $t''_2$. During the third operation phase from time point $t''_2$ to time point $t''_3$, the second switch (K2) enters the ON state, the fifth and eighth switches (K5, K8) remain in the ON state, the first, third, fourth, sixth and seventh switches (K1, K3, K4, K6, K7) remain in the OFF state, the input current corresponding to the input voltage received at the second side (DC2) continues to flow sequentially through the conducting MOSFET 51 of the fifth switch (K5), the secondary winding (L2) and the conducting MOSFET 51 of the eighth switch (K8), and the induction current generated by the primary winding (L1) flows sequentially through the resonant inductor (Lr), the resonant capacitor (Cr), the conducting MOSFET 51 of the second switch (K2) and the body diode 52 of the non-conducting MOSFET 51 of the fourth switch (K4) to perform further charging of the resonant capacitor (Cr), so a voltage at a common node of the resonant capacitor (Cr) and the resonant inductor (Lr) is increased, thereby preparing for the next charging in a reverse direction. During the fourth operation phase from time point $t''_3$ to time point $t''_4$, all of the first to eighth switches (K1-K8) stay in the OFF state, preventing simultaneous conduction of the MOSFETs 51 of the fifth and sixth switches (K5, K6) and simultaneous conduction of the MOSFETs 51 of the seventh and eighth switches (K7, K8). During the fifth operation phase from time point $t''_4$ to time point $t''_5$, the sixth and seventh switches (K6, K7) enter the ON state while the first to fifth and eighth switches (K1-K5, K8) remain in the OFF state, the input current corresponding to the input voltage received at the second side (DC2) flows sequentially through the conducting MOSFET 51 of the seventh switch (K7), the secondary winding (L2) and the conducting MOSFET 51 of the sixth switch (K6), and the induction current generated by the primary winding (L1) flows sequentially through the body diode 52 of the non-conducting MOSFET 51 of the third switch (K3), the first filtering capacitor (C1), the body diode 52 of the non-conducting MOSFET 51 of the second switch (K2), the resonant capacitor (Cr) and the resonant inductor (Lr) to perform resonant charging of the resonant capacitor (Cr) and the resonant inductor (Lr) and charging of the first filtering capacitor (C1), thereby converting the input voltage received at the second side (DC2) to the output voltage provided at the first side (DC1). One cycle of resonance of the resonant capacitor (Cr) and the resonant inductor (Lr) completes at time point $t''_5$. During the sixth operation phase from time point $t''_5$ to time point $t''_6$, the fourth switch (K4) enters the ON state, the sixth and seventh switches (K6, K7) remain in the ON state, the first to third, fifth and eighth switches (K1-K3, K5, K8) remain in the OFF state, the input current corresponding to the input voltage received at the second side (DC2) continues to flow sequentially through the conducting MOSFET 51 of the seventh switch (K7), the secondary winding (L2) and the conducting MOSFET 51 of the sixth switch (K6), and the induction current generated by the primary winding (L1) flows sequentially through the conducting MOSFET 51 of the fourth switch (K4), the body diode 52 of the non-conducting MOSFET 51 of the second switch (K2), the resonant capacitor (Cr) and the resonant inductor (Lr) to perform further charging of the resonant capacitor (Cr), so a voltage at the first node (n1) is increased, thereby preparing for the next charging in a reverse direction. At time point $t''_6$, the sixth operation phase of the current control cycle (T") ends, and the first operation phase of a next control cycle begins.

In view of the above, in this embodiment, by virtue of the controller 20 controlling the second and fourth switches (K2, K4) to transition between the ON state and the OFF state in the third conversion mode so as to perform further charging of the resonant capacitor (Cr), step-up conversion from the second side (D2) to the first side (D1) can be realized.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A direct current to direct current (DC to DC) power converter device comprising:
    a DC to DC resonant converter having a first side and a second side, each of said first and second sides including a positive terminal and a negative terminal, said DC to DC resonant converter including
        a first full bridge chopper circuit including a first switch, a second switch, a third switch and a fourth switch, said first switch being coupled between said positive terminal of said first side and a first node, said second switch being coupled between said first node and said negative terminal of said first side, said third switch being coupled between said positive terminal of said first side and a second node, said fourth switch being coupled between said second node and said negative terminal of said first side,
        a second full bridge chopper circuit including a fifth switch, a sixth switch, a seventh switch and an eighth switch, said fifth switch being coupled between said positive terminal of said second side and a third node, said sixth switch being coupled between said third node and said negative terminal of said second side, said seventh switch being coupled between said positive terminal of said second side and a fourth node, said eighth switch being coupled between said fourth node and said negative terminal of said second side, and
        an LLC resonant circuit including a resonant capacitor, a resonant inductor and a transformer, said transformer including a primary winding and a secondary winding, said resonant capacitor, said resonant inductor and said primary winding being coupled in series between said first and second nodes, said secondary winding being coupled between said third and fourth nodes; and
    a controller coupled to said first to eighth switches, and controlling transition of each of said first to eighth switches between an ON state and an OFF state so that said DC to DC resonant converter operates in one of a first conversion mode, a second conversion mode and a third conversion mode; in the first conversion mode, an input voltage received at said first side being converted to an output voltage provided at said second side; in each of the second and third conversion modes, an input voltage received at said second side being converted to an output voltage provided at said first side;
    wherein, to cause said DC to DC resonant converter to operate in the third conversion mode, said controller controls said first to eighth switches in such a way that said second and fourth to eighth switches transition between the ON state and the OFF state with the ON state reoccurring at a frequency lower than a resonant frequency of said DC to DC power converter device when said second side serves as an input side, wherein the resonant frequency is related to said resonant capacitor and said resonant inductor, and wherein said fifth and eighth switches transition between the ON state and the OFF state synchronously, said sixth and seventh switches transition between the ON state and the OFF state synchronously, an operating state of said sixth switch is substantially always different from an operating state of said fifth switch, said sixth switch transitions from the OFF state to the ON state after said fifth switch transitions from the ON state to the OFF state, and transitions from the ON state to the OFF state before said fifth switch transitions from the OFF state to the ON state, said second switch transitions from the OFF state to the ON state upon completion of one cycle of resonance of said resonant capacitor and said resonant inductor when said fifth switch stays in the ON state, and transitions from the ON state to the OFF state upon said fifth switch transitioning from the ON state to the OFF state, and said fourth switch transitions from the OFF state to the ON state upon completion of one cycle of resonance of said resonant capacitor and said resonant inductor when said sixth switch stays in the ON state, and transitions from the ON state to the OFF state upon said sixth switch transitioning from the ON state to the OFF state, and said first and third switches stay in the OFF state.

2. The DC to DC power converter device of claim 1, wherein, to cause said DC to DC resonant converter to operate in the first conversion mode, said controller controls said first to eighth switches in such a way that said first to fourth switches transition between the ON state and the OFF state with the ON state reoccurring at a frequency, where said first and fourth switches transition between the ON state and the OFF state synchronously, said second and third switches transition between the ON state and the OFF state synchronously, an operating state of said second switch is substantially always different from an operating state of said first switch, and said second switch transitions from the OFF state to the ON state after said first switch transitions from the ON state to the OFF state, and transitions from the ON state to the OFF state before said first switch transitions from the OFF state to the ON state, and said fifth to eighth switches stay in the OFF state.

3. The DC to DC power converter device of claim 1, wherein, to cause said DC to DC resonant converter to operate in the second conversion mode, said controller controls said first to eighth switches in such a way that said fifth to eighth switches transition between the ON state and the OFF state with the ON state reoccurring at a frequency higher than the resonant frequency, where said fifth and eighth switches transition between the ON state and the OFF state synchronously, said sixth and seventh switches transition between the ON state and the OFF state synchronously, the operating state of said sixth switch is substantially always different from the operating state of said fifth switch, and said sixth switch transitions from the OFF state to the ON state after said fifth switch transitions from the ON state to the OFF state, and transitions from the ON state to the OFF state before said fifth switch transitions from the OFF state to the ON state, and said first to fourth switches stay in the OFF state.

4. The DC to DC power converter device of claim 1, wherein said first to fourth switches are identical to one another, and each of said first to fourth switches includes a metal oxide semiconductor field effect transistor (MOSFET).

5. The DC to DC power converter device of claim 1, wherein said first to fourth switches are identical to one another, and each of said first to fourth switches includes an insulated gate bipolar transistor (IGBT) and an anti-parallel diode coupled to said IGBT.

6. The DC to DC power converter device of claim 1, wherein said fifth to eighth switches are identical to one another, and each of said fifth to eighth switches includes a MOSFET.

7. The DC to DC power converter device of claim 1, wherein said fifth to eighth switches are identical to one another, and each of said fifth to eighth switches includes an IGBT and an anti-parallel diode coupled to said IGBT.

8. The DC to DC power converter device of claim 1, wherein said DC to DC resonant converter further includes a first filtering capacitor and a second filtering capacitor, said first filtering capacitor is coupled between said positive and negative terminals of said first side, and said second filtering capacitor is coupled between said positive and negative terminals of said second side.

9. A control method for controlling a direct current to direct current (DC to DC) resonant converter, the DC to DC resonant converter having a first side and a second side, each of the first and second sides including a positive terminal and a negative terminal, the DC to DC resonant converter including a first full bridge chopper circuit, a second full bridge chopper circuit and an LLC resonant circuit, the first full bridge chopper circuit including a first switch, a second switch, a third switch and a fourth switch, the first switch being coupled between the positive terminal of the first side and a first node, the second switch being coupled between the first node and the negative terminal of the first side, the third switch being coupled between the positive terminal of the first side and a second node, the fourth switch being coupled between the second node and the negative terminal of the first side, the second full bridge chopper circuit including a fifth switch, a sixth switch, a seventh switch and an eighth switch, the fifth switch being coupled between the positive terminal of the second side and a third node, the sixth switch being coupled between the third node and the negative terminal of the second side, the seventh switch being coupled between the positive terminal of the second side and a fourth node, the eighth switch being coupled between the fourth node and the negative terminal of the second side, the LLC resonant circuit including a resonant capacitor, a resonant inductor and a transformer, the transformer including a primary winding and a secondary winding, the resonant capacitor, the resonant inductor and the primary winding being coupled in series between the first and second nodes, the secondary winding being coupled between the third and fourth nodes, said control method comprising a procedure that is performed when the second side serves as an input side while the first side serves as an output side, and that includes steps of:

controlling the second and fourth to eighth switches to transition between an ON state and an OFF state with the ON state reoccurring at a frequency lower than a resonant frequency of the DC to DC power converter device when the second side serves as the input side, wherein the resonant frequency is related to the resonant capacitor and the resonant inductor, and wherein the fifth and eighth switches transition between the ON state and the OFF state synchronously, the sixth and seventh switches transition between the ON state and the OFF state synchronously, an operating state of the sixth switch is substantially always different from an operating state of the fifth switch, the sixth switch transitions from the OFF state to the ON state after the fifth switch transitions from the ON state to the OFF state, and transitions from the ON state to the OFF state before the fifth switch transitions from the OFF state to the ON state, the second switch transitions from the OFF state to the ON state upon completion of one cycle of resonance of the resonant capacitor and the resonant inductor when the fifth switch stays in the ON state, and transitions from the ON state to the OFF state upon the fifth switch transitioning from the ON state to the OFF state, and the fourth switch transitions from the OFF state to the ON state upon completion of one cycle of resonance of the resonant capacitor and the resonant inductor when the sixth switch stays in the ON state, and transitions from the ON state to the OFF state upon the sixth switch transitioning from the ON state to the OFF state; and controlling the first and third switches to stay in an OFF state.

10. The control method of claim 9, further comprising another procedure that is performed when the first side serves as an input side while the second side serves as an output side, and that includes steps of:

controlling the first to fourth switches to transition between the ON state and the OFF state with the ON state reoccurring at a frequency, where the first and fourth switches transition between the ON state and the OFF state synchronously, the second and third switches transition between the ON state and the OFF state synchronously, an operating state of the second switch is substantially always different from an operating state of the first switch, and the second switch transitions from the OFF state to the ON state after the first switch transitions from the ON state to the OFF state, and transitions from the ON state to the OFF state before the first switch transitions from the OFF state to the ON state; and controlling the fifth to eighth switches to stay in the OFF state.

11. The control method of claim 9, further comprising another procedure that is performed when the second side serves as an input side while the first side serves as an output side, and that includes steps of:

controlling the fifth to eighth switches to transition between the ON state and the OFF state with the ON state reoccurring at a frequency higher than the resonant frequency, where the fifth and eighth switches transition between the ON state and the OFF state synchronously, the sixth and seventh switches transition between the ON state and the OFF state synchronously, the operating state of the sixth switch is substantially always different from the operating state of the fifth switch, and the sixth switch transitions from the OFF state to the ON state after the fifth switch transitions from the ON state to the OFF state, and transitions from the ON state to the OFF state before the fifth switch transitions from the OFF state to the ON state; and controlling the first to fourth switches to stay in the OFF state.

* * * * *